United States Patent
Rave et al.

(10) Patent No.: US 7,996,580 B2
(45) Date of Patent: Aug. 9, 2011

(54) SYSTEM AND METHOD FOR NOTIFYING A HOST OF A SERVICE REQUIRED BY A SLAVE STORAGE DEVICE

(75) Inventors: Micha Rave, Herzliya (IL); Nir Perry, Holon (IL)

(73) Assignee: SanDisk IL Ltd., Kfar Saba (IL)

( * ) Notice: Subject to any disclaimer, the term of this patent is extended or adjusted under 35 U.S.C. 154(b) by 57 days.

(21) Appl. No.: 11/953,084

(22) Filed: Dec. 10, 2007

(65) Prior Publication Data

US 2009/0150703 A1 Jun. 11, 2009

(51) Int. Cl.
*G06F 3/00* (2006.01)
*G06F 5/00* (2006.01)

(52) U.S. Cl. ............... 710/15; 710/14; 710/16; 710/17; 710/18; 710/19; 710/48

(58) Field of Classification Search ............ 710/48, 710/14–19
See application file for complete search history.

(56) References Cited

U.S. PATENT DOCUMENTS

| | | | |
|---|---|---|---|
| 5,038,275 A * | 8/1991 | Dujari | 710/19 |
| 5,283,904 A * | 2/1994 | Carson et al. | 710/266 |
| 5,404,546 A | 4/1995 | Stewart | |
| 5,822,568 A * | 10/1998 | Swanstrom | 703/24 |
| 5,862,393 A * | 1/1999 | Davis | 713/300 |
| 6,021,475 A * | 2/2000 | Nguyen et al. | 711/156 |
| 6,678,831 B1 | 1/2004 | Mustafa et al. | |
| 6,944,687 B2 | 9/2005 | Doragh et al. | |
| 7,093,141 B2 | 8/2006 | Elnozahy et al. | |
| 7,124,248 B2 * | 10/2006 | Huffman et al. | 711/115 |
| 7,386,640 B2 * | 6/2008 | Lee et al. | 710/19 |
| 2004/0123169 A1 | 6/2004 | Elnozahy et al. | |
| 2005/0015632 A1 | 1/2005 | Chheda et al. | |
| 2006/0179379 A1 | 8/2006 | Ke | |
| 2007/0198757 A1 | 8/2007 | Kim | |
| 2007/0211551 A1 * | 9/2007 | Yogev et al. | 365/226 |

OTHER PUBLICATIONS

U.S. Appl. No. 11/928,110, filed Oct. 2007, Signaling Interrupt Request Through Daisy Chained Devices.
U.S. Appl. No. 11/927,108, filed Oct. 2007, Addressing an Addressless Device on a Shared Bus.

* cited by examiner

*Primary Examiner* — Chun-Kuan Lee
(74) *Attorney, Agent, or Firm* — Martine Penilla & Gencarella, LLP

(57) ABSTRACT

A host device includes an electrical activity monitoring (EAM) module that is configured to monitor the electrical activity of a slave storage device interfaced with the host device. Responsive to the value of, or change in, the electric current fed to the slave storage device being at or near a certain level, or within a predetermined range, the EAM module notifies the host device that the slave storage device has pending service request(s) or information for the host device.

21 Claims, 3 Drawing Sheets

SYSTEM AND METHOD FOR NOTIFYING A HOST OF A SERVICE REQUIRED BY A SLAVE STORAGE DEVICE

FIELD OF THE INVENTION

The present invention generally relates to the field of non-volatile memories, and more specifically to a method for notifying a host device of a service that is required by a slave storage device, and to a system and a host device that use the method.

BACKGROUND

Non-volatile storage devices, such as flash memory devices, communicate with their host device (e.g., a digital camera) by using a communication protocol, which allows the host device and the non-volatile storage device to exchange data and various types of messages. For example, if the host device wants to write (or read) data to (or from) the storage device, the host device communicates to the storage device a corresponding "Write" (or "Read") instruction.

Host devices usually include an interrupt control module (referred to herein as "interrupt controller" (IC)), such as a Programmable Interrupt Controller (PIC), for handling interrupts as they occur. Upon receiving an interrupt signal, the host device's interrupt controller checks its priority and forwards it to an intended hardware unit or application within the host for handling. Traditionally, storage devices have been designed to wait until they are addressed by their host, for which reason they are commonly referred to as "slaves", as opposed to their hosts which are commonly referred to as "masters". An aspect of the traditional design of storage devices is that storage devices do not have an access to their host's interrupt controller, which leaves much, if not all, of the communication initiative to the hosts. Sometimes, though, it is useful to render a service to a slave storage device before its "waiting period" (i.e., the time elapsing from the last visit till the next time the host visits the storage device) runs out. In general, to get a service from a master host the slave storage device sends a service request to the master host. However, because, as explained above, slave devices do not have an access to their host's interrupt controller, the slave device has to wait until it is addressed by its host, during which waiting period the service request is said to be "pending". This conduct poses a problem because the host also handles other tasks, for which reason it may take a while before the master host addresses the slave device. Therefore, the host is not aware in real-time of the storage device requiring a service, which slows down the interaction between the slave storage device and the host.

Master hosts usually address their slave storage devices by using a polling mechanism; i.e., the master host addresses ("visits") one slave device at a time to check whether the currently addressed storage device has a message or a pending service request waiting for the master host, or the slave device needs to exchange information with the master host.

Using a polling mechanism has several deficiencies. In order to respond to messages originating from slave storage devices, the polling mechanism has to be active continuously. However, an active polling mechanism consumes power and handheld devices, such as mobile phones, are highly power-constrained. One implication of this is that processes executed in battery-operated systems have stringent power constraints. In addition, if the polling mechanism is active continually other processes, applications, and circuits, of the host cannot enter a "sleep" mode, which exacerbate the power consumption problem. Therefore, in some systems, the polling application is switched off momentarily, at times, to conserve battery power. However, switching off the polling application "blinds" the host. It blinds the host in the sense that, as long as the polling application is inactive, the host cannot be aware in realtime of any pending service request originating from, or of a process that is executed in, the slave device. Therefore, it would be beneficial to have a mechanism that will circumvent the problem of a slave storage device not having a direct connection to the interrupt controller of its host, and that will enable the host to "sense" in real-time when the slave storage device needs a service, regardless of the existence or absence of a polling mechanism.

SUMMARY

The following embodiments and aspects thereof are described and illustrated in conjunction with systems, tools, and methods, which are meant to be exemplary and illustrative but not limiting in scope.

As part of the present disclosure a system is provided for notifying a master host computing system (referred to hereinafter as a "master host") of, or indicating to the master host that a change occurred in a status of a slave storage device, or that the slave storage device has one or more pending service requests to the host. The system may include a master host, a slave storage device interfaced with the master host, and a electrical activity monitoring (EAM) module functionally coupled to a CPU of the master host.

The EAM module may monitor the electrical activity of the slave storage device by monitoring the electric current fed to the slave storage device, and, responsive to the electric current, or a change thereof, being at or near a certain level or within a predetermined range, generate and send a corresponding notification, for example as a message or signal, to the master host. The certain level or predetermined range may be specific, for example to an operation mode of the storage device.

The EAM module may notify the master host of a change in the electrical activity of the slave storage device by generating and forwarding the notification to a central processing unit (CPU) in the master host to prompt a response from the master host, which response may include, for example, causing the CPU to (re)activate or execute a polling application, or another type of application, on the master host. The EAM module may forward the notification to an interrupt control (IC) functionality that may be incorporated or embedded into the CPU, or external to the CPU.

A level of, or a change in, the electrical activity of the slave storage device may be used as an indication for the master host that the slave storage device's status, has changed, for example from one operation mode to another, or that the slave storage device has one or more pending service requests to the host. An operation mode may be, for example, "idle mode" or "active mode", or any other discernible mode. By using the EAM module the host may be able to sense when a slave storage device requires the attention of the host.

The notification sent by the EAM module to the host may prompt a response from the host; e.g., from the host's CPU, which response may include, for example, prompting or urging the slave storage device to declare its status or pending service request(s). By "status" is meant herein, but is not limited to, the storage device's current activity, current operation mode, activity history, and operation modes history. The master host may prompt or urge the storage device to declare its status or pending service request(s) by activating, reactivating, or waking, a dormant application, which may be, for example, a polling application or the like, which may inquire the storage device for its status, for example.

In one embodiment of the present disclosure the EAM module is an integral part of the master host. In another embodiment of the present disclosure the EAM module is external to the master host.

As part of the present disclosure a method is disclosed for generating, for a slave storage device, a notification to a master host, the method may include monitoring, by an electrical activity monitoring (EAM) module, the electrical activity of a slave storage device interfaced with a master host; and generating by the EAM module, for the host, a notification responsive to the value of the electrical current, or a change thereof, being at or near a certain level, or within a predetermined range. The EAM module may forward the notification to the host in order to prompt a response from the host, which response may include, for example, prompting or urging the slave storage device to declare its status or pending service request. In an embodiment of the present disclosure prompting a response from the host includes (re)activating an application such as a polling application.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

Figure 1:
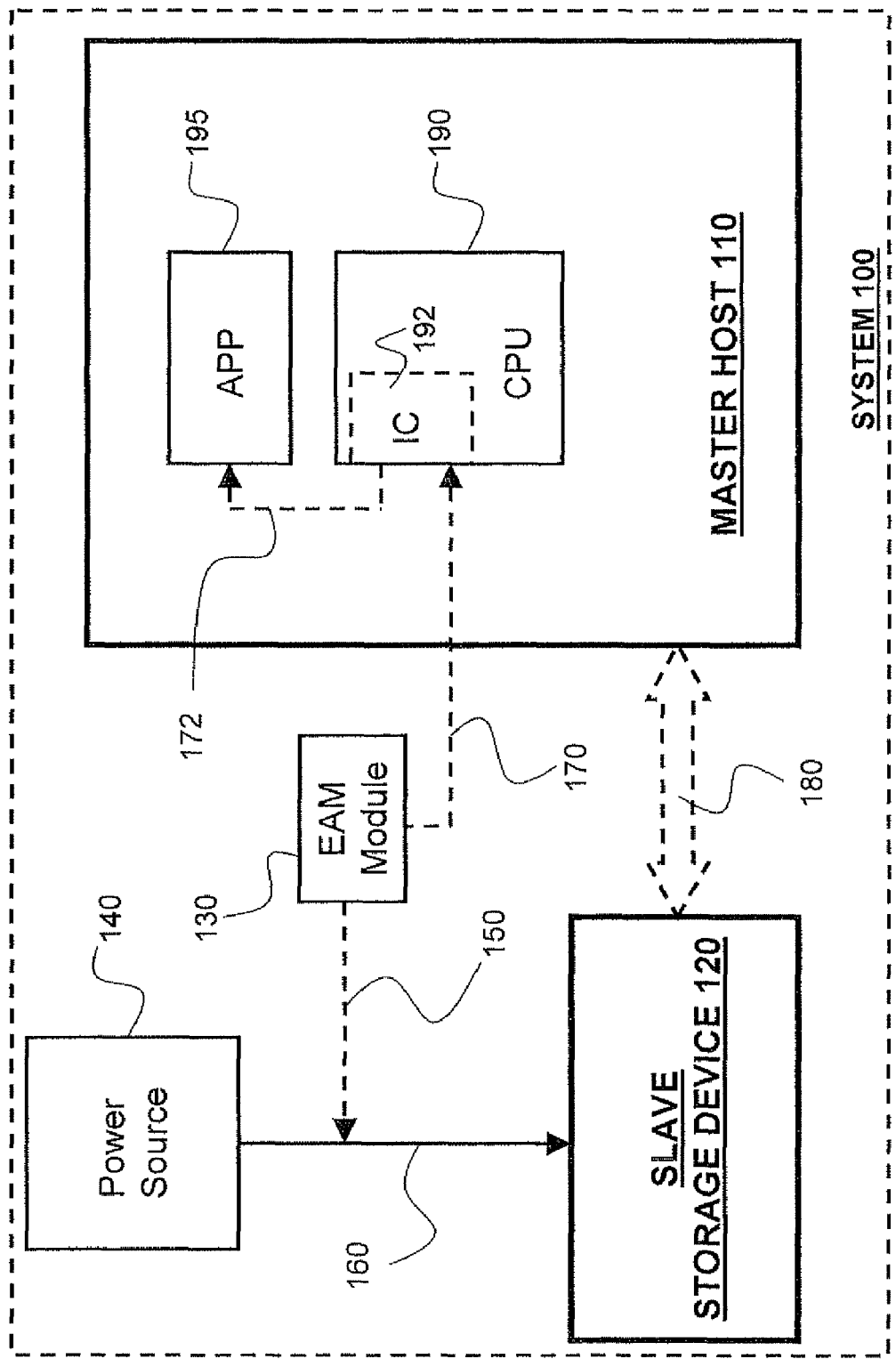
FIG. 1 schematically illustrates a system according to one embodiment of the present disclosure.

It will be appreciated that for simplicity and clarity of illustration, elements shown in the figures are not necessarily drawn to scale. Further, where considered appropriate reference numerals may be repeated among the figures to indicate like, corresponding or analogous elements.

DETAILED DESCRIPTION

The claims below will be better understood by referring to the present detailed description of embodiments of the invention. This description is not intended to limit the scope of claims but instead to provide examples of the invention.

According to the present disclosure, to circumvent the problems described above, a notification associated with the electrical activity of a slave storage device is generated outside the slave storage device and concurrently forwarded to the master host. Responsive to receiving the notification, the master host may prepare to receive a message or a pending service request from the slave storage device.

By "sending or forwarding a notification to the host" is meant herein sending or forwarding a signal or a message to the host's CPU or to another kind of hardware or software module in the host, or to an interrupt module or controller in the host. The host's CPU may include an interrupt module, controller, or functionality, to handle the interrupt for, or in conjunction with, the CPU, and with the host in general.

FIG. 1 schematically illustrates a general system 100 according to one embodiment of the present invention. System 100 includes a master host 110, a slave storage device 120 interfaced with, or hosted by, master host 110, a electrical activity monitoring (EAM) module 130, and a power source 140 for powering slave storage device 120 and, optionally (not shown in FIG. 1), master host 110. Master host 110 includes a central processing unit (CPU 190). CPU 190 includes an interrupt controller (IC) 192, which may be a programmable interrupt controller (PIC), for example.

Slave storage device 120 does not have a connection to the host's interrupt controller 192, for which reason slave storage device 120 cannot initiatively or proactively send pending service requests and messages to master host 110. This means that, if slave storage device 120 has a pending service request or message for master host 110, slave storage device 120 has no way of getting the attention of master host 110 in real-time. To deliver a service request or message to master host 110 slave storage device 120 has to wait until it is probed, or addressed, by master host 110. To circumvent this deficiency, a notification may be generated in or for (depending on the system configuration) master host 110 on behalf of slave storage device 120, as described below.

Slav storage device 120 typically is a flash memory device. Flash memory devices typically are not self-powered; i.e., they do not contain a power source. Therefore, storage devices have to get electrical power from an external power source, which usually resides in their host. Slave storage device 120 is shown in FIG. 1 powered (shown at 160) by power source 140.

EAM module 130 may monitor (shown at 150) a current fed (shown at 160) to slave storage device 120 from power source 140, which is associated with the electrical activity of slave storage device 120. Monitoring (i.e., by continually measuring) an electric current is known to a person of ordinary skill in the art. Briefly, the current fed to slave storage device 120 can be measured by using a shunt resistor. A shunt resistor, which has an accurately-known resistance, is placed in series so that all the current to be measured will flow through it. Since the resistance is known, the current of interest can be calculated by measuring the voltage drop across it. In order not to disrupt the electrical circuit, the resistance of the shunt resistor is relatively very small.

Responsive to the value of the monitored current or a change thereof being at or near a certain level, or within a predetermined range, EAM module 130 notifies master host 110 that a change occurred in the status of slave storage device 120, or that slave storage device 120 changed from one operation mode to another, or that slave storage device 120 has one or more pending service requests or messages to send to master host 110. The operation mode may be, for example, an "idle mode" or an "active mode", or any other discernible mode of storage device 120. EAM module 130 may send the notification, for example to interrupt controller (IC) 192, which is shown in FIG. 1 as an integral part of CPU 190.

The notification sent (generally shown at 170) from EAM module 130 to IC 192 may prompt a response (shown at 180) from master host 110, which response may include, for example, responding to or acknowledging a pending service request of slave storage device 120, and/or prompting or urging (at 180) slave storage device 120 to declare its status (shown at 180) to master host 110. Master host 110 may prompt or urge (shown at 180) slave storage device 120 to declare it status or pending service request(s) by using, enabling, (re)activating, or waking, a polling application or another type of application (APP.) (generally shown at 195 as "APP.") that resides on master host 120. The series of actions to be executed by master host 110 in order to prompt slave storage device 120 to declare it status or pending service request(s) may be decided by the interrupt controller (IC) 192. If a polling application is dormant in master host 110 and reactivated in response to the EAM module sending a notification to host 110, it may be said that the polling application is conditionally enabled, where the condition is the slave storage device requiring service from mast host 110. In response to the prompt message sent (at 180) from master host 110 to slave storage device 120, slave storage device 120 may return (at 180) to master host 110 a pending service request, a message, or a requested information; e.g., the historic or current status of slave storage device 120.

Responsive to receiving the notification from EAM module 130, IC 192 checks (e.g., in previously stored data) the priority level associated with the notification, and, in addition, what series of actions were specified for the notification. For example, the action that was specified for the notification can involve activating a corresponding application. IC 192 is shown (at 172) activating APP. 195. APP. 195 may be a polling application that can either be dormant or running on master host 110 when the EAM module 130 sends the notification to IC 192.

EAM module 130 may study a correlation between different operation modes of the slave storage device 120 and the respective electric current requirements. For example, when a Secure Digital (SD) card (an exemplary slave storage device) switches between "idle" mode and "active" mode, the difference between the respective electric currents is about 9-11 milliampere (mA). By "active mode" is meant performing, by the SD card, writing, reading, or erasing operation. It is noted that different electric currents can be expected to be associated with different types of storage devices. To study the correlation between different operation modes and the respective electric currents, EAM module 130 may initiate a test procedure to probe slave storage device 120. In the embodiment shown in FIG. 1 EAM module 130 is external to master host 110.

Figure 2:
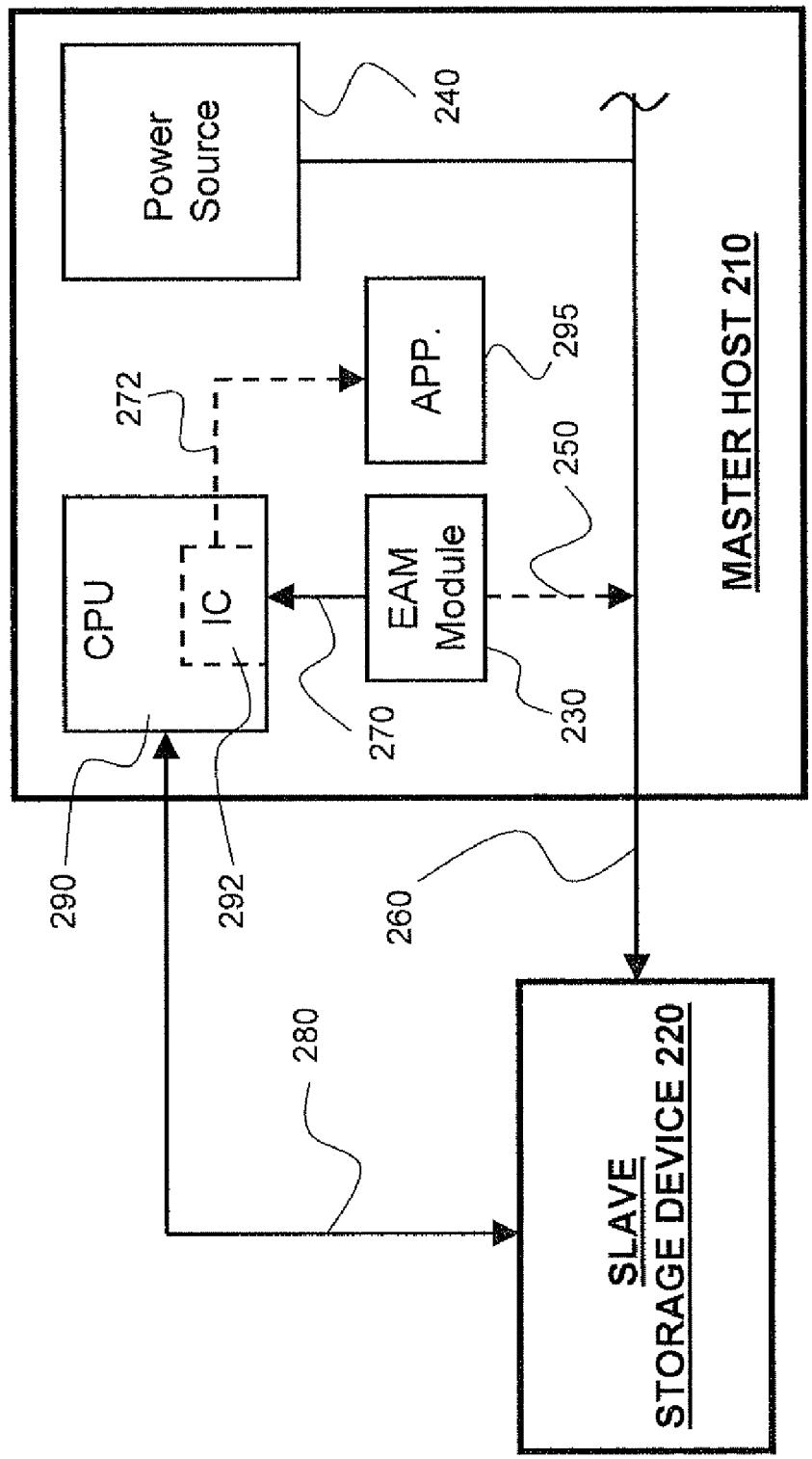
FIG. 2 schematically illustrates a system according to another embodiment of the present disclosure.

FIG. 2 schematically illustrates a master host 210 according to another embodiment of the present disclosure. Master host 210 interfaces with a slave storage device 220. Master host 210 includes a CPU 290, which executes program instructions, an integral power source 240, and an integral electrical activity monitoring (EAM) module 230. Power source 240 powers both master host 210 and slave storage device 220 (shown at 260). Slave storage device 220 may be, for example, a flash memory device (e.g., a NAND flash device).

Like EAM module 130, EAM module 230 monitors (shown at 250) the electric current fed to slave storage device 220 from power source 240 and forwards (shown at 270) a notification to interrupt controller (IC) 292 in CPU 290, which functions in the same way as IC 192 of FIG. 1. IC 292 checks the priority level associated with the notification, and, in addition, what series of actions have been specified for the notification. For example, an action that was specified for notification may be activating a corresponding application. For example, IC 292 is shown (at 272) activating APP. 295. APP. 295 may be a polling application that can either be dormant or running on master host 210 when EAM 230 sends the notification to IC 292.

The notification sent (shown at 270) from EAM module 230 to CPU 290 prompts a response (shown at 280) from CPU 290. The response may include, for example, responding to, or acknowledging, a pending service request of storage device 220, or prompting or urging (shown at 280) storage device 220 to declare its status. Master host 210 may prompt or urge (shown at 280) slave storage device 220 to declare it status, for example by using, enabling, (re)activating, or waking, a polling application or another type of application (generally shown at 295 as "APP.") that can run on master host 210. It may be said, therefore, that the polling application is conditionally enabled or (re)activated, where the condition is the slave storage device 220 changed electrical activity, which is interpreted by the master host 210 as the slave storage device requiring service. In response to the prompt message sent (at 280) from master host 210 to slave storage device 220, slave storage device 220 may return (at 280) to master host 210 a pending service request, a message, or a requested information; e.g., the status of slave storage device 210.

Some distributed computer systems utilize a centralized power management module that monitors a central processing unit (CPU) of each computer in the computer system. The power management module monitors power consumption at the CPU of that computer and transmits power consumption data to the power management module. The power management module then applies a set of rules to the power consumption data to determine when, and at which computer in the group, to enable or disable a CPU power throttling mode. An exemplary power management module is described, for example in U.S. Patent publication 2005/0015632, to Chheda et al. Accordingly, EAM module 130 and EAM module 230 can be integrated with, embedded, incorporated or affiliated into such a power management module, or a power management module may be adapted, modified, or configured, to implement the functionality of EAM module 130 or EAM module 230.

Figure 3:
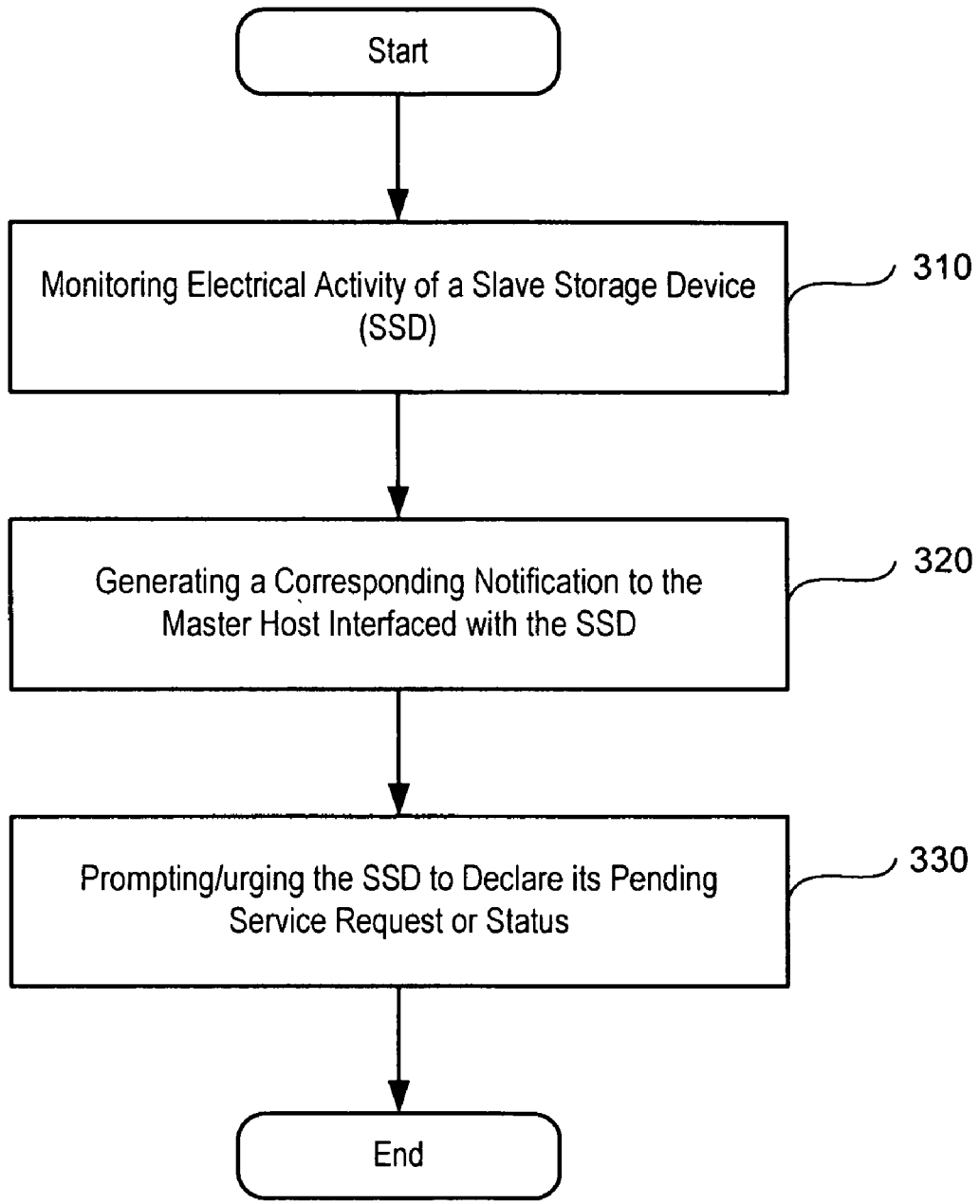
FIG. 3 is a method for generating a notification signal or message to a master host according to an embodiment of the present disclosure.

FIG. 3 is an exemplary method for generating a notification to a master host according to an embodiment of the present disclosure. FIG. 3 will be described in association with FIG. 2. At step 310, EAM module 230 monitors an electric current associated with the electrical activity of slave storage device (SSD) 220. At step 320, EAM module 230 generates a notification responsive to the value of the electric current, or a change thereof being at or near a certain level, or within a predetermined range. EAM module 230 forwards (shown at 270) the notification to interrupt controller (IC) 292 to thereby prompt a response from master host 210. At step 330, responsive to the EAM module 230 forwarding the notification to IC 292, and as part of the prompted response, IC 292 activates (shown at 272) APP. 295 to thereby prompt or urge (shown at 280) slave storage device 220 to declare its pending service request, status, or operation mode. Slave storage device 220 may comply with, or respond to, the request by sending (shown at 280) to master host 210 the required information (e.g., pending service request(s), mode of operation, status, etc.).

By using an electrical activity monitoring (EAM) module in the way disclosed herein, APP. 295, which may be a polling application or another application, may be dormant for the longest possible period; that is, until a change in the electrical activity of the slave storage device is sensed, which indicates that the slave storage device has pending service request(s) and/or information for the master host. Therefore, by using an EAM module as disclosed herein, the system's overall power consumption can be reduced without violating system responsiveness constraints.

Having thus described exemplary embodiments of the invention, it will be apparent to those skilled in the art that modifications of the disclosed embodiments will be within the scope of the invention. For example, the polling application may already be awake when EAM module 130 of FIG. 1, or EAM module 230 of FIG. 2, sends the notification to the host, or it may be dormant and woken responsive to such notification(s). In addition, the notification generated by the EAM module can as well be used by hosts which are not "masters".

The present disclosure is likewise relevant, mutatis mutandis, to various types of storage devices and hosts. Accordingly, additional alternations, modifications, and improvements of the disclosed invention, though not expressly described above, are nonetheless intended and implied to be within spirit and scope of the invention.

What is claimed is:

1. A system comprising:
   a) a host device, the host device including an interrupt controller for handling interrupts;
   b) a slave storage device interfaced with the host device;
   c) a power source for providing a current to the slave storage device; and
   d) an electrical activity monitoring module interfaced with the interrupt controller and the power source that provides the current, the electrical activity monitoring module determining a correlation between different operation modes of the slave storage device and respective electric current requirements by initiating a test procedure to probe the slave storage device, the electrical activity monitoring module monitoring the current and sending a notification to the interrupt controller regarding a change in the current between current levels correlated to different operation modes, in order to prompt a response from the host device, the response including conditionally activating a polling application from an inactive state on the host device to initiate communication with the slave storage device without waiting for the polling application to poll the slave storage device, the polling application configured to periodically address the slave storage device when active.

2. The system according to claim 1, wherein the electrical activity monitoring module forwards the notification to the interrupt controller responsive to the current having a value at or near a certain level, or being within a predetermined range, based on the determined correlation.

3. The system according to claim 2, wherein the power source is an integrated component of the host device.

4. The system according to claim 1, wherein the notification generated by said electrical activity monitoring module is indicative of an operation mode of said slave storage device.

5. The system according to claim 4, wherein the operation mode is selected from the group consisting of "idle mode" and "active mode".

6. The system according to claim 1, wherein responsive to the notification being sent by the electrical activity monitoring module the host device prompts the slave storage device to declare the slave storage device's status or pending service request.

7. The system according to claim 1, in which the electrical activity monitoring module is an integrated component of the host device.

8. A host device for a slave storage device, the host device comprising:
   a) a central processing unit, the central processing unit including an interrupt controller for handling interrupts;
   b) a power source for providing a current to the slave storage device; and
   c) an electrical activity monitoring module interfaced with the interrupt controller and the power source that provides the current, the electrical activity monitoring module determining a correlation between different operation modes of the slave storage device and respective electric current requirements by initiating a test procedure to probe the slave storage device, the electrical activity monitoring module monitoring the current and sending a notification to the interrupt controller regarding a change in the current provided to the slave storage device between current levels correlated to different operation modes, in order to prompt a response from the host device, the response including conditionally activating a polling application from an inactive state on the host device to initiate communication with the slave storage device without waiting for the polling application to poll the slave storage device, the polling application configured to periodically address the slave storage device when active.

9. The host device according to claim 8, wherein the electrical activity monitoring module generates the notification responsive to the current being provided to the slave storage device from the power source being at or near a certain level or within a predetermined range, based on the determined correlation.

10. The host device according to claim 9, wherein the certain level or predetermined range is specific to an operation mode of the host device.

11. The host device according to claim 8, wherein the notification generated by the electrical activity monitoring module indicates an operation mode of said slave storage device.

12. The host device according to claim 11, wherein the operation mode is selected from the group consisting of "idle mode" and "active mode".

13. The host device according to claim 8, wherein responsive to the notification generated by the electrical activity monitoring module the central processing unit prompts the storage device to declare the slave storage device's status.

14. A host device for a slave storage device, the host device comprising:
   a) a central processing unit, the central processing unit comprising an interrupt controller, and
   b) an electrical activity monitoring module for determining a correlation between different operation modes of the slave storage device and respective electric current requirements by initiating a test procedure to probe the slave storage device, monitoring an electric current provided to the slave storage device, and generating a notification for the interrupt controller responsive to the electric current, or a change thereof, being at or near a certain level or within a predetermined range, the certain level or predetermined range correlated to one of the different operation modes, to prompt a response from the host device, the response including conditionally activating a polling application from an inactive state on the host device to initiate communication with the slave storage device without waiting for the polling application to poll the slave storage device, the polling application configured to periodically address the slave storage device when active.

15. The host device according to claim 14, wherein the electrical activity monitoring module forwards the notification to the interrupt controller to activate the polling application to thereby prompt the response from the host device.

16. A method of generating a notification, for a slave storage device, to a host device, the method comprising:
   a) determining a correlation between different operation modes of the slave storage device and respective electric current requirements by initiating a test procedure to probe the slave storage device;

b) monitoring by the electrical activity monitoring module an electric current provided to the slave storage device, said slave storage device interfacing with the host device; and c) generating by the electrical activity monitoring module the notification responsive to the electric current, or a change thereof, being at or near a certain level, or within a predetermined range, the certain level or predetermined range correlated to one of the different operation modes, the notification being forwarded to an interrupt controller of the host device in order to prompt a response from the host device, the response including conditionally activating a polling application from an inactive state on the host device to initiate communication with the slave storage device without waiting for the polling application to poll the slave storage device, the polling application configured to periodically address the slave storage device when active.

17. The method of claim 16, further comprising:

responsive to the electrical activity monitoring module forwarding the notification to the host device, d) prompting the slave storage device to send to the host device a pending service request or an information.

18. The method according to claim 16, wherein the certain level or predetermined range is specific to an operation mode of the slave storage device.

19. The method according to claim 16, wherein the notification generated by the electrical activity monitoring module indicates that the storage device has a pending service request.

20. The method according to claim 19, wherein the notification generated by the electrical activity monitoring module indicates an operation mode of said slave storage device, the operation mode being selected from the group consisting of "idle mode" and "active mode".

21. The method according to claim 16, wherein prompting the response from the host device comprises activating the polling application to prompt the slave storage device to send a pending service request or an information to the host device.

* * * * *